(12) United States Patent
Yoon

(10) Patent No.: US 12,176,819 B2
(45) Date of Patent: Dec. 24, 2024

(54) MOTOR-INTEGRATED INVERTER

(71) Applicants: Hyundai Motor Company, Seoul (KR); Kia Corporation, Seoul (KR)

(72) Inventor: Jae Hoon Yoon, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 357 days.

(21) Appl. No.: 17/694,945

(22) Filed: Mar. 15, 2022

(65) Prior Publication Data

US 2022/0368239 A1     Nov. 17, 2022

(30) Foreign Application Priority Data

May 14, 2021   (KR) ........................ 10-2021-0062676

(51) Int. Cl.
*H02M 7/00* (2006.01)
*H02K 7/00* (2006.01)
*H02K 9/00* (2006.01)
*H02K 11/30* (2016.01)

(52) U.S. Cl.
CPC ............ *H02M 7/003* (2013.01); *H02K 7/003* (2013.01); *H02K 9/00* (2013.01); *H02K 11/30* (2016.01)

(58) Field of Classification Search
CPC .......... H02M 7/003; H02K 11/30; H02K 9/19
See application file for complete search history.

(56) References Cited

U.S. PATENT DOCUMENTS

| 2015/0328993 | A1* | 11/2015 | Shin | ................. | H05K 7/20927 |
| | | | | | 307/10.1 |
| 2019/0386547 | A1* | 12/2019 | Im | ........................ | H02K 11/33 |
| 2021/0075301 | A1* | 3/2021 | Ichikawa | ............... | B60R 16/03 |

FOREIGN PATENT DOCUMENTS

KR          10-1803733 B1      12/2017

* cited by examiner

*Primary Examiner* — Tulsidas C Patel
*Assistant Examiner* — Mohammed Ahmed Qureshi
(74) *Attorney, Agent, or Firm* — Morgan, Lewis & Bockius LLP

(57) ABSTRACT

A motor-integrated inverter coupled in a shaft direction of a motor is provided, the motor-integrated inverter including: a power module generating driving electric power for driving the motor; and a cooler arranged to avoid an extension line of the shaft of the motor, the cooler including an outer side part and an inner side part communicating with each other while being spaced apart from each other in a direction in which the shaft of the motor extends, thereby defining a double structure, wherein the power module is disposed between the outer side part and the inner side part, the outer side part has an inlet port provided at one side thereof such that a refrigerant is introduced, the outer side part has an outlet port provided at the other side thereof such that a refrigerant is discharged to the outside.

11 Claims, 7 Drawing Sheets

MOTOR-INTEGRATED INVERTER

CROSS-REFERENCE TO RELATED APPLICATION

This application claims the priority benefit of Korean Patent Application No. 10-2021-0062676, filed on May 14, 2021, in the Korean Intellectual Property Office, the disclosure of which is incorporated herein by reference.

TECHNICAL FIELD

The present disclosure relates to a motor-integrated inverter and, more specifically, to a motor-integrated inverter installed on a shaft end of a motor and positioned parallel to the motor.

BACKGROUND

In general, an eco-friendly vehicle is driven by a motor supplied with electric power through an inverter. The inverter includes a power module having a switching element, a cooler for cooling the power module, a control board for on/off control of the switching element inside the power module, and a capacitor configured to generate a DC voltage in an inverter circuit including switching elements in the power module.

A conventional motor driving system has a reducer installed on a side surface of the motor so as to reduce rotation of the motor shaft, and has an inverter coupled to the upper portion of the motor.

Such a conventional motor driving system has a problem in that, if the motor size increases in the lateral direction due to a change in the torque required for the motor, the installation position and connection structure of the inverter on the upper portion of the motor vary.

According to recent development, therefore, inverters are coupled in the direction in which motor shafts extend.

However, this approach has a problem in that it is difficult to efficiently cool the power module mounted on the inverter in the direction in which the motor shaft extends.

The above descriptions regarding background technologies have been made only to help understanding of the background of the present disclosure, and are not to be deemed by those skilled in the art to correspond to already-known prior arts, and should not be taken as acknowledgment that this information forms any part of prior art.

SUMMARY

The present disclosure has been proposed to solve the above-mentioned problems, and it is an aspect of the present disclosure to efficiently cool multiple power modules disposed on a motor-integrated inverter installed in the motor shaft direction and positioned parallel to the motor.

A motor-integrated inverter according to the present disclosure is coupled in a shaft direction of a motor and includes: a power module configured to generate driving electric power for driving the motor; and a cooler arranged to avoid an extension line of the shaft of the motor, the cooler including an outer side part and an inner side part configured to communicate with each other while being spaced apart from each other in a direction in which the shaft of the motor extends, thereby defining a double structure, wherein the power module is disposed between the outer side part and the inner side part, the outer side part has an inlet port provided at one side of thereof such that a refrigerant is introduced, the outer side part has an outlet port provided at the other side thereof such that a refrigerant is discharged to the outside, and a refrigerant introduced through the inlet port flows through the inside of the outer side part and the inside of the inner side part and is then discharged through the outlet port.

The inner side part may have a hollow part formed therein, multiple outer side parts may be arranged at both sides of the inner side part, and the cooler may further include a communicating part configured to communicate with the outer side part and the inner side part such that the refrigerant flows between the outer side part and the inner side part.

The outer side part may include a first outer side part having the inlet port formed at one side thereof such that the refrigerant flows to the outer side part and the inner side part, and a second outer side part having the outlet port formed at one side thereof such that the refrigerant introduced into the inner side part is discharged through the outlet port.

The communicating part may include: a first communicating part formed at the other side of the first outer side part so as to communicate with the inner side part; a second communicating part formed at the other side of the second outer side part so as to communicate with the inner side part; and a third communicating part configured to communicate with the inlet port such that the first outer side part and the inner side part communicate with each other.

The flow velocity of the refrigerant flowing through the outer side part and the inner side part may be set based on a size of a cross-sectional area of the third communicating part.

The power module may be disposed between the outer side part and the inner side part so as to be symmetric with reference to the shaft of the motor.

The motor-integrated inverter may further include a capacitor part configured to provide direct-current electric power to the power module, and the capacitor part may have a through-hole formed through a center thereof.

One side surface of the inner side part may be in surface contact with the capacitor part.

The shaft may have an end part protruding outside a cover of the motor, and the end part of the shaft may be inserted in the through-hole formed through the capacitor part.

The motor-integrated inverter may further include a power module busbar to which motor driving electric power output from the power module is transferred, and the power module busbar may extend from the power module to an upper side of the capacitor part.

The power module busbar may be fastened to a motor busbar connected to an input terminal configured to receive each phase driving electric power of the motor at the upper side of the capacitor part.

A motor-integrated inverter according to the present disclosure is coupled in the direction in which the motor shaft extends such that, even if the motor size increases in the horizontal direction, the same connection structure can be maintained. This is advantageous in that there is no need for a design change required when the inverter is installed on the upper portion of the motor. Accordingly, the motor-integrated inverter makes it possible to reduce the time and manpower necessary to design the motor system, and is particularly advantageous in the case of a system which employs multiple inverters and thus requires a large number of power modules.

In addition, the motor-integrated inverter according to the present disclosure has multiple power modules arranged to be symmetric with reference to the extension line of the motor shaft, and are positioned between coolers formed in a double structure. As a result, a refrigerant may flow into the coolers and cools the multiple power modules from both sides.

In addition, the refrigerant simultaneously flows into the first outer side part and an inner side part of each cooler, and the refrigerant flows from the inner side part to the second outer side part and is discharged to the outside. Therefore, the flow rate inside the first outer side part, the second outer side part, and the inner side part may be set by setting the size of the cross-sectional area of the third communicating part that connects the first outer side part and the inner side part. This is advantageous in that power modules may be arranged according to the amount of heat generated by each power module, thereby improving the power module cooling efficiency.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
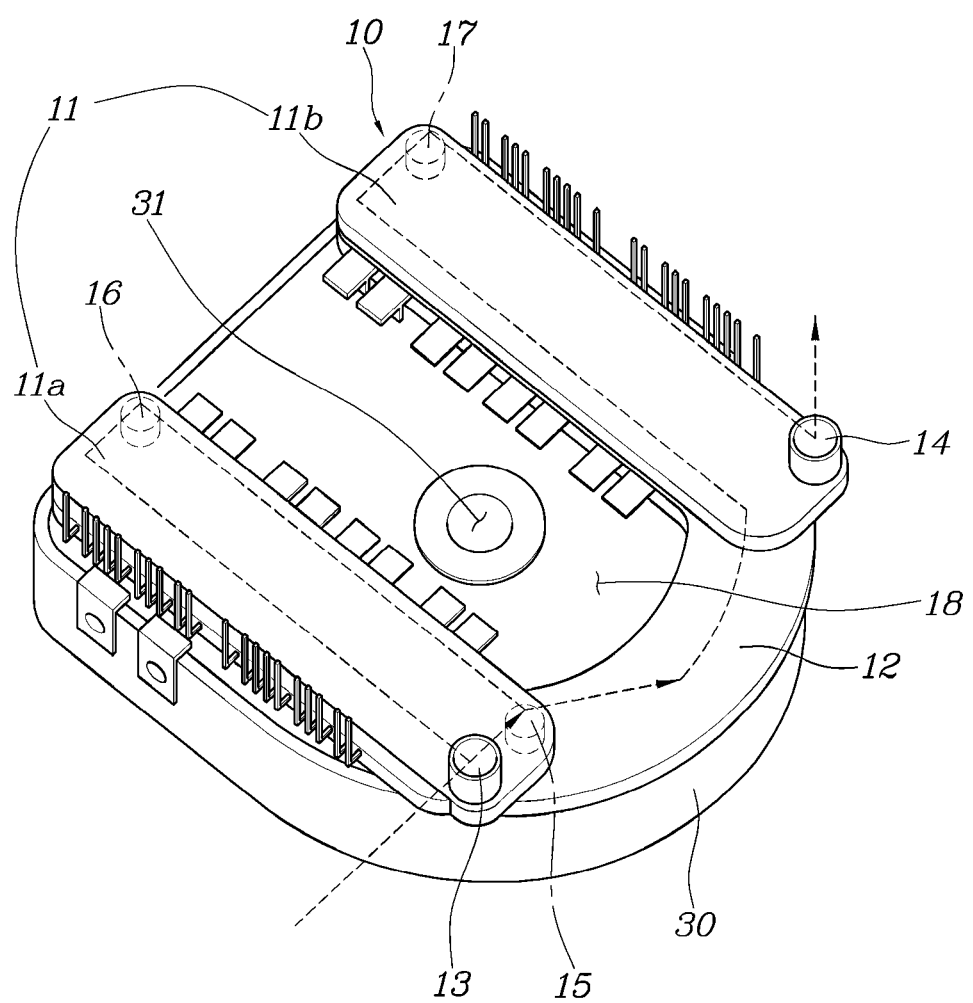
FIG. 1 is a view showing a first embodiment of a cooler of a motor-integrated inverter and a flow route of refrigerant according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. The same or like reference signs presented in the drawings designate the same or like elements.

Figure 2:
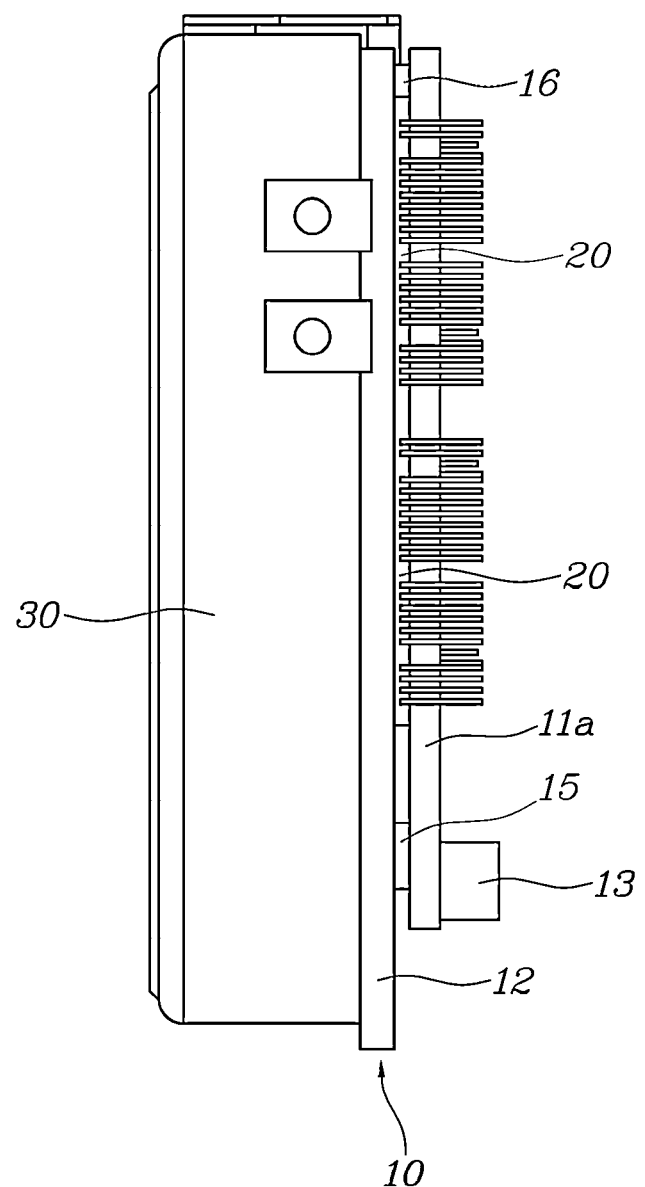
FIG. 2 is a side view of a cooler of a motor-integrated inverter according to an embodiment of the present disclosure.
Figure 3:
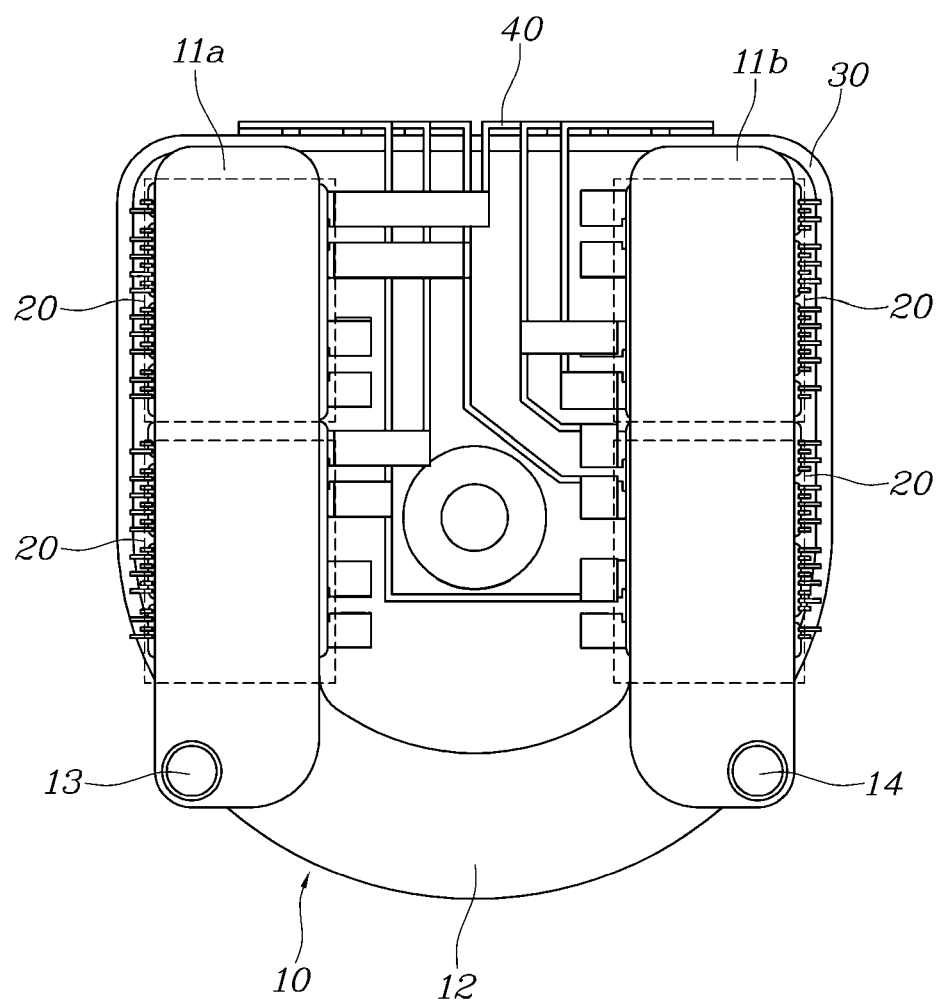
FIG. 3 is a view showing a mounting position of a power module of a motor-integrated inverter according to an embodiment of the present disclosure.
Figure 4:
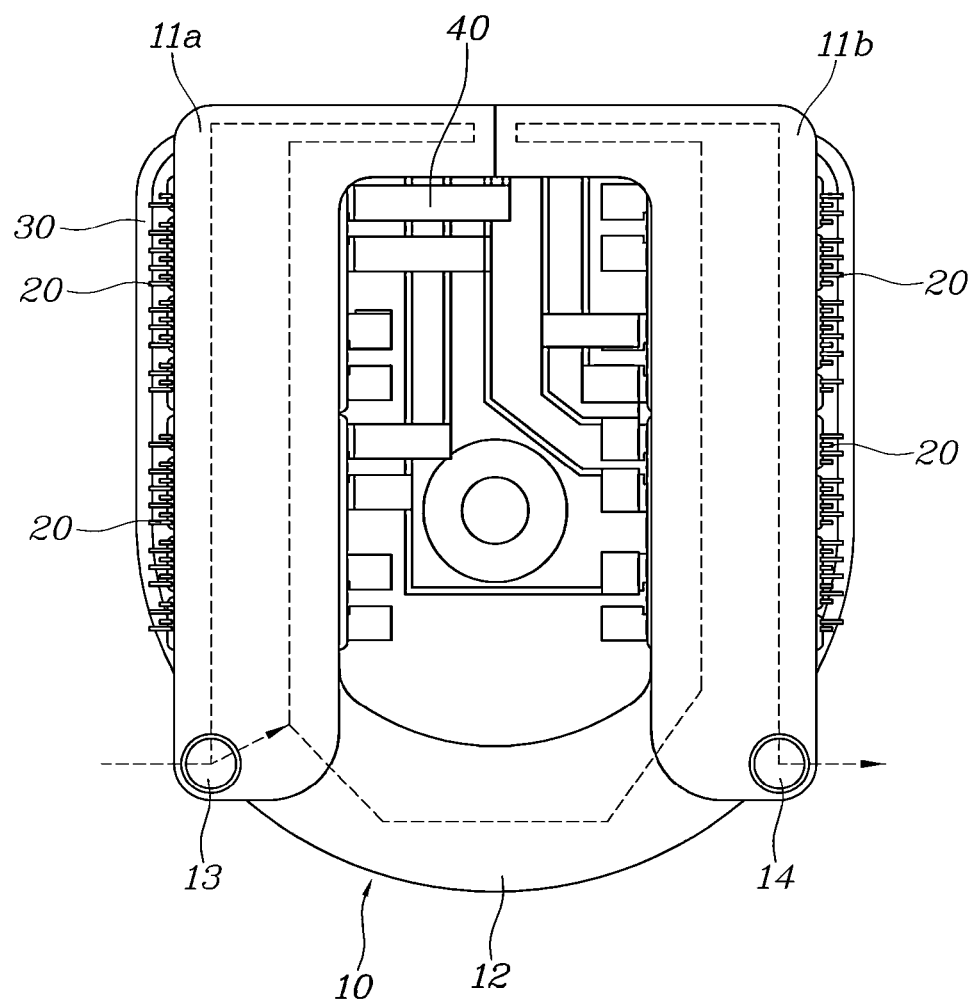
FIG. 4 is a view showing a second embodiment of a cooler of a motor-integrated inverter according to an embodiment of the present disclosure.
Figure 5:
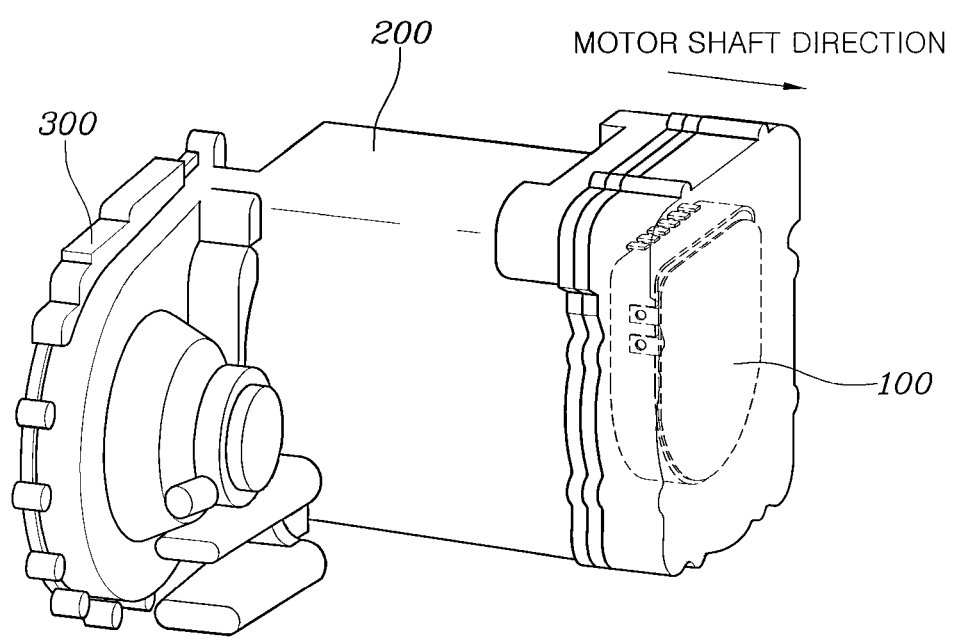
FIG. 5 is a perspective view showing the outward appearance of a motor-integrated inverter according to an embodiment of the present disclosure.
Figure 6:
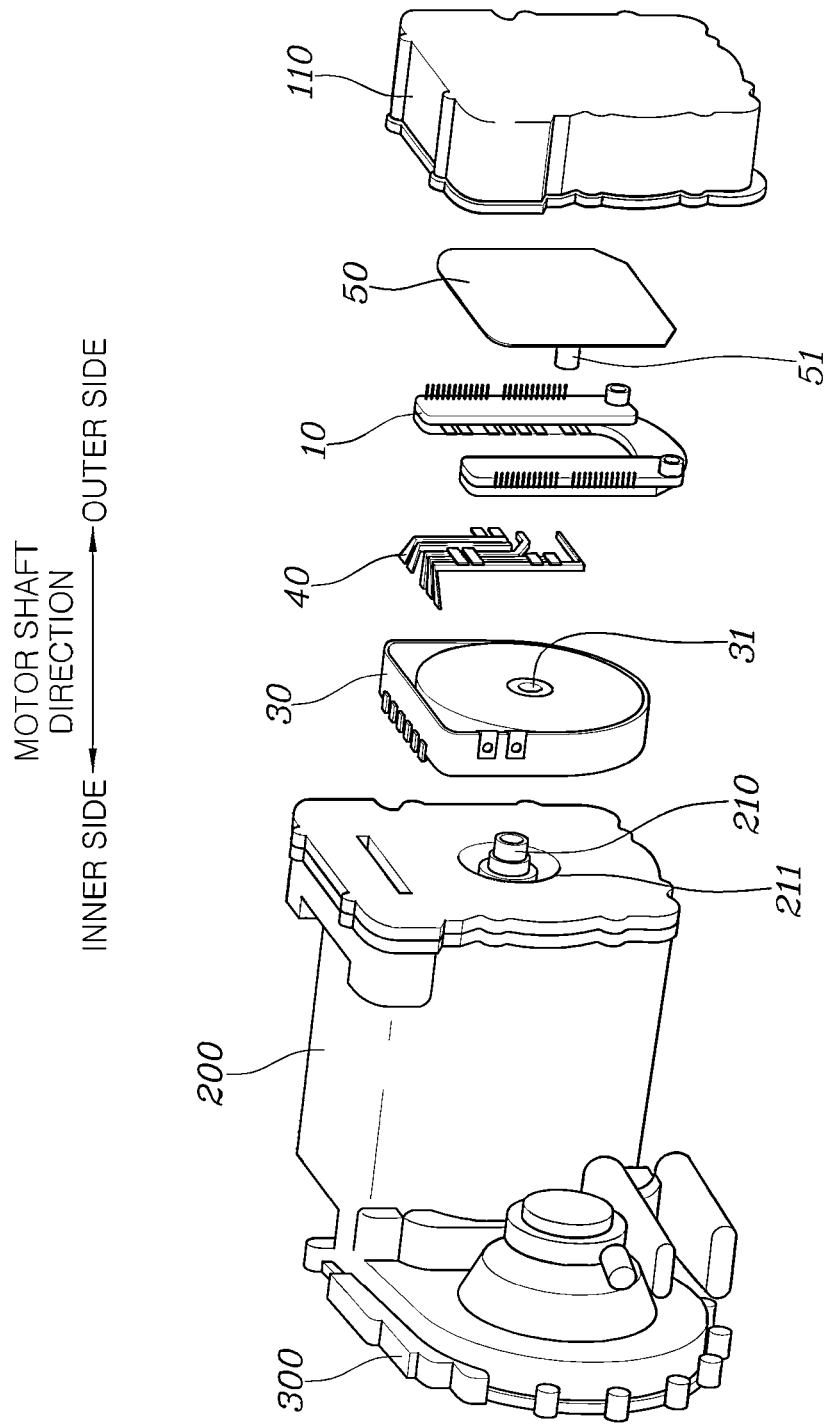
FIG. 6 is an exploded view of a motor-integrated inverter according to an embodiment mode of the present disclosure illustrated in FIG. 5.
Figure 7:
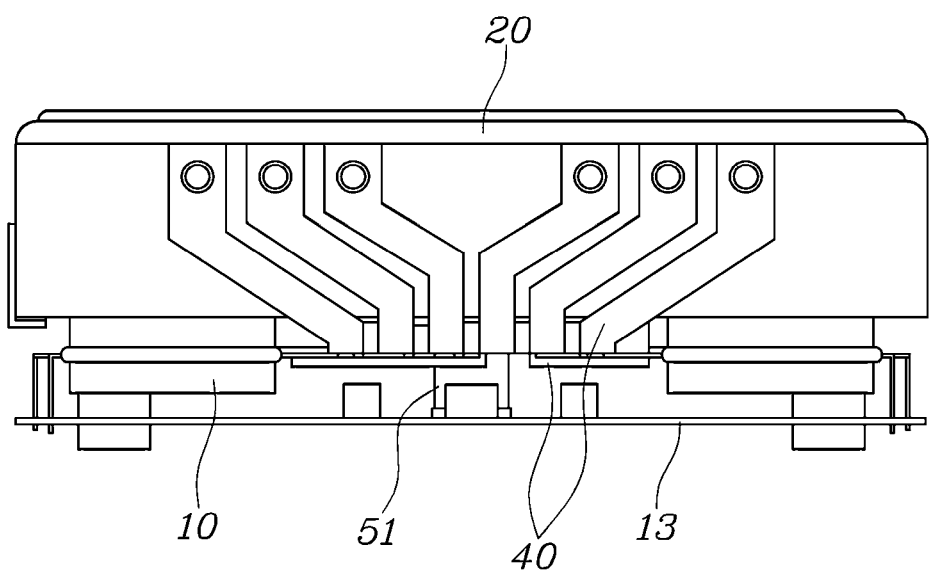
FIG. 7 is a plan view of a state in which a cover part of a motor-integrated inverter according to an embodiment mode of the present disclosure illustrated in FIG. 1. is removed.

FIG. 1 is a view showing a first embodiment of a cooler 10 of an inverter 100 integrated with a motor 200 and a flow route of refrigerant according to an embodiment of the present disclosure, FIG. 2 is a side view of a cooler 10 of an inverter 100 integrated with a motor 200 according to an embodiment of the present disclosure, FIG. 3 is a view showing a mounting position of a power module 20 of an inverter 100 integrated with a motor 200 according to an embodiment of the present disclosure, FIG. 4 is a view showing a second embodiment of a cooler 10 of an inverter 100 integrated with a motor 200 according to an embodiment of the present disclosure, FIG. 5 is a perspective view showing the outward appearance of an inverter 100 integrated with a motor 200 according to an embodiment of the present disclosure, FIG. 6 is an exploded view of an inverter 100 integrated with a motor 200 according to an embodiment mode of the present disclosure illustrated in FIG. 5, and FIG. 7 is a plan view of a state in which a cover part of an inverter 100 integrated with a motor 200 according to an embodiment mode of the present disclosure illustrated in FIG. 1. is removed.

Referring to FIG. 1 to FIG. 7, a preferred embodiment of an inverter 100 integrated with a motor 200 according to the present disclosure will be described.

As illustrated in FIG. 5, according to the inverter 100 integrated with the motor 200 according to the present disclosure, a shaft of the motor 200 may be formed in a horizontal direction, and a reducer 300, the motor 200, and the inverter 100 may be coupled in that order in the horizontal direction.

Therefore, a space above the motor 200 may be secured, and thus a space in which many different additional components may be installed may be secured. Accordingly, there may be an advantage that the design change of the inverter 100 does not need to be changed even though the motor 200 extends in the horizontal direction.

An inverter 100 integrated with a motor 200 according to the present disclosure is integrally coupled to a motor 200 in a direction in which the shaft of the motor 200 extends. The inverter 100 includes a power module 20 configured to generate driving electric power for driving the motor 200, and a cooler 10 arranged to avoid an extension line of the shaft. The cooler 10 includes an outer side part 11 and an inner side part 12 spaced apart from each other in the direction in which the shaft of the motor 200 extends and configured to communicate with each other in a double structure. The power module 20 is disposed between the outer side part 11 and the inner side part 12. The outer side part 11 has an inlet port 13 provided at one side thereof such that a refrigerant is introduced. The outer side part 11 has an outlet port 14 provided at the other side thereof such that the refrigerant is discharged to the outside. The refrigerant introduced through the inlet port 13 flows through the inside of the outer side part 11 and the inside of the inner side part 12 and is then discharged through the outlet port 14.

As illustrated in FIG. 1, the power module 20 may input electric power to the motor 200 to drive the motor 200, and the cooler 10 may have a cooling channel therein through which refrigerant flows so as to reduce heating from the power module 20 which is in contact with the refrigerant through the cooling channel.

The cooler 10 may be formed in a double structure divided into the outer side part 11 and the inner side part 12 to enable refrigerant to flow through the outer side part 11 and the inner side part 12, and can cool the power module 20 disposed between the outer side part 11 and the inner side part 12.

A shaft direction of the motor 200 is illustrated in FIG. 5 and FIG. 6, and an inner side and outer side thereof may be divided with reference to the motor. Therefore, the inner side part 12 may be a portion which is located at the inner side of a portion of the cooler 10 formed in the double structure, and the outer side part 11 may be defined as a portion which is placed outside from the inner side part 12.

Refrigerant may be introduced through the inlet port 13 formed at the outer side part 11, and, after having been introduced thereinto, may flow to the cooling channel inside the outer side part 11, or may flow to the cooling channel of the inner side part 12. In addition, the refrigerant introduced into the inner side part 12 may again flow to the outer side part 11 and may then be discharged through the outlet port 14 provided at the outer side part 11.

In addition, the inverter 100 integrated with the motor 200 according to the present disclosure may be coupled to the motor 200 on the same axis as the shaft of the motor 200 for cooling, and, accordingly, the cooler 10 may be formed in a letter "U" or "O" shape to avoid the shaft in the case where the shaft of the motor 200 protrudes.

Hereinafter, the detailed shape of the cooler 10 will be described.

The inner side part 12 may have a hollow part 18 formed thereon, and the outer side part 11 may be formed to have multiple outer side parts so as to be arranged at both sides of the inner side part 12. In addition, the cooler 10 may further include a communicating part which communicates with the outer side part 11 and the inner side part 12 to enable refrigerant therein to flow therethrough.

According to one embodiment, the inner side part 12 may have the hollow part 18 formed thereon to avoid the shaft of the motor 200, and may be formed in the shape of the letter "U" or "O". In addition, according to one embodiment, the outer side part 11 may be formed in a letter "I" shape, and the outer side parts of both sides of the inner side part 12 may communicate with each other through the communicating part. Therefore, the refrigerant in the outer side part 11 and the inner side part 12 can flow therethrough.

In addition, the power module 20 may be arranged between the outer side part 11 and the inner side part 12 so as to be symmetric with reference to the shaft of the motor 200.

The outer side part 11 may be placed at each of both sides of the inner side part 12, and the power module 20 may thus be arranged between the outer side part 11 and the inner side part 12. Therefore, the power module 20 may have multiple power modules arranged therebetween.

Multiple power modules 20 may be arranged so as to be symmetric with reference to the shaft, and may be arranged at the outer side part 11 and the inner side part 12, through which the refrigerant flows preferentially, in the descending order of the amount of generated heat.

The outer side part 11 may include a first outer side part 11a, which has the inlet port 13 formed at one side thereof and configured such that refrigerant flows to the outer side part 11 and the inner side part 12, and a second outer side part 11b, which has the outlet port 14 formed at one side thereof and configured such that the refrigerant that has been introduced into the inner side part 12 is discharged to the outlet port 14.

The first outer side part 11a may have the inlet port 13 formed at one side thereof to enable refrigerant to be introduced from the outside, and may have the communicating part formed thereon to enable the refrigerant in the inner side part 12 to flow therethrough. The communicating part may be formed such that the refrigerant flowing through the cooling channel of the inner side part 12 flows to the second outer side part 11b.

The second outer side part 11b may have the outlet port 14 formed therethrough to allow the refrigerant that has been introduced from the inner side part 12 to be discharged to the outside. Therefore, refrigerant may cool both sides of the power module 20 disposed between the outer side part 11 and the inner side part 12 through the first outer side part 11a, the inner side part 12, and the second outer side part 11b.

The communicating part may include a first communicating part 16 formed at the other side of the first outer side part 11a so as to communicate with the inner side part 12, a second communicating part 17 formed at the other side of the second outer side part 11b to communicate therewith, and a third communicating part 15 which communicates with the inlet port 13 and is configured such that the first outer side part 11a and the inner side part 12 communicate with each other.

The refrigerant that has been introduced into the inlet port 13 of the first outer side part 11a may flow to the cooling channel of the first outer side part 11a, or when refrigerant is introduced into the first outer side part 11a through the inlet port 13, the refrigerant may immediately flow to the cooling channel of the inner side part 12 through the third communicating part 15.

In addition, refrigerant may flow from the inner side part 12 through the second communicating part 17 positioned at the other side of the first outer side part 11a after flowing through the cooling channel of the first outer side part 11a.

The refrigerant that has been preferentially introduced into the third communicating part 15 may flow to the cooling channel of the inner side part 12, and may then flow to the second outer side part 11b through the second communicating part 17 which is connected to the second outer side part 11b.

Therefore, even though refrigerant may be preferentially introduced into the first outer side part 11a, the refrigerant may immediately flow to the inner side part 12 through the third communicating part 15, and may then flow to the second outer side part 11b. Accordingly, there may be an advantage that refrigerant flows through the entire cooling channel of the cooler 10.

The flow velocity of refrigerant flowing through the outer side part 11 and the inner side part 12 may be set based on the size of a cross-sectional area of the third communicating part 15.

The third communicating part 15 may communicate with the inlet port 13, and some of the refrigerant introduced into the inlet port 13 may immediately flow to the inner side part 12.

The flow rate of refrigerant flowing to the inner side part 12 may be set by the cross-sectional area of the third communicating part 15.

As one example, in order for the flow rate of refrigerant to be set to be high in the side of the first outer side part 11a, the size of the cross-sectional area of the third communicating part 15 may be set to be smaller than the size of the inlet port 13 or the cooling channel, and in the case where the flow rate of refrigerant is set to be high in the side of the second outer side part 11b through the inner side part 12, the size of the cross-sectional area of the third communicating part 15 is set to be larger than the size of the inlet port 13 or the cooling channel.

Therefore, there may be an advantage that the flow rate of refrigerant through the first outer side part 11a and the second outer side part 11b is set.

In one embodiment of the present disclosure, a method in which the motor 200 connected to one power module 20 is driven is referred to as a close end winding method, and a method in which two power modules 20 are used, two power modules 20 are connected to respective both ends of a coil, and ends of the coil of the motor 200 are therefore not short-circuited to each other, is referred to as an open end winding method.

Therefore, whether not or to use the power module 20 may be determined according to an operation mode of the motor 200 controlled by a control board, and accordingly, the amount of heat of the power module 20 may be set.

This is advantageous in that the refrigerant flow rate is proportional to the amount of heat generated by each positioned power module 20, thereby improving the power module cooling efficiency.

The inverter 100 integrated with the motor 200 may further include a capacitor part 30 for providing direct current electric power to the power module, and the capacitor part 30 may have a through-hole 31 formed through the center thereof.

The capacitor part 30 may have the shape of a donut having the through-hole 31 penetrating the front and rear surface thereof. The capacitor part 30 may have a structure including a cover and a capacitor installed in the cover, and a bus-bar-fastening-part for forming an electric connection with each phase of the motor 200 may be formed on the upper surface of the cover. The bus-bar-fastening-part is a portion in which a motor 200 busbar and a busbar are fastened to each other, wherein the motor 200 busbar is connected to a driving electric power input terminal of each phase of the motor 200 through the through-hole 31 formed through the cover of the motor 211, and the busbar receives driving electric power output from the power module 20 to be described later.

One side surface of the inner side part 12 may be in surface contact with the capacitor part 30.

One side surface of the inner side part 12, which is not in contact with the outer side part 11, may be in contact with the capacitor part 30, and thus, according to the flow of refrigerant flowing through the cooling channel of the inside thereof, is capable of cooling the capacitor part 30 so as to reduce the amount of heat generated from the capacitor part 30.

Therefore, the cooler 10 can simultaneously cool the power module 20 and the capacitor part 30.

A control board 50 that implements a control circuit for controlling the power module 20 may be provided on a surface of the cooler 10, which is opposite to the capacitor part 30. The control board 50 may be provided with various kinds of ICs which generate control signals for controlling the power module 20 and may be provided with active or passive electric/electronic elements, so as to drive a circuit board and the motor 200. Accordingly, a conductive pattern (not shown) formed on the control board 50 may be electrically connected to a signal lead of the power module.

The shaft has an end part 210 protruding outside the cover of the motor 211, and the end part 210 of the shaft may be inserted into the through-hole 31 formed through the capacitor part 30.

The shaft may have a rotation angle sensor 51 for measuring rotation angles of the motor 200 or a temperature sensor 51 for measuring the amount of heat of the motor 200 which is provided inside the end part 210 protruding outside the cover of the motor 211. The rotation angle sensor 51 or the temperature sensor 51 may be connected to the control board connected to the power module 20, and the control board may control the power module 20 on the basis of the information provided by the rotation angle sensor 51 and the temperature sensor 51.

Accordingly, the end part 210 of the shaft may be inserted into the through-hole 31 formed through the capacitor part 30 so that the capacitor part 30 is coupled to the motor 200.

The inverter 100 integrated with the motor 200 may further include a power module busbar 40 to which motor driving electric power output from the power module 20 is transferred, and the power module busbar 40 may extend from the power module 20 to the upper side of the capacitor part 30.

One end of the busbar may be connected to a motor driving electric power output terminal of the power module, and, as described above, the other end thereof may be fastened to the busbar connected to each phase input terminal of the motor 200 at the bus-bar-fastening-part positioned above the capacitor part 30.

The power module busbar 40 may be fastened to the motor 200 busbar connected to an input terminal for receiving each phase driving electric power of the motor 200 at the upper side of the capacitor part 30.

The power module busbar 40 may avoid from a housing of the capacitor part 30, which is coupled to the motor 200, in order to be connected to the motor 200. Therefore, the power module busbar 40 may extend above the capacitor part 30 to be coupled to the motor 200. In addition, when an inverter housing 110 for surrounding the inverter 100 is opened, the power module busbar 40 may be placed at the upper side thereof so that ease of maintenance thereof can be improved.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A motor-integrated inverter coupled in a shaft direction of a motor, the motor-integrated inverter comprising:
    a power module generating driving electric power for driving the motor; and
    a cooler arranged to avoid an extension line of a shaft of the motor, the cooler comprising an outer side part and an inner side part communicating with each other while being spaced apart from each other in a direction in which the shaft of the motor extends, thereby defining a double structure,
    wherein the power module is disposed between the outer side part and the inner side part, the outer side part comprising an inlet port provided at one side thereof configured to receive a refrigerant that is introduced, the outer side part comprising an outlet port provided at an other side thereof such that the refrigerant is discharged out of the outer side part, and the refrigerant introduced through the inlet port flows through an inside of the outer side part and an inside of the inner side part and is then discharged through the outlet port,
    wherein the inner side part comprises a hollow part formed thereon to avoid the shaft of the motor.

2. The motor-integrated inverter of claim 1, wherein the inner side part comprises multiple outer side parts are arranged at the sides of the inner side part, and the cooler further comprises a communicating part communicating with the outer side part and the inner side part such that the refrigerant flows between the outer side part and the inner side part.

3. The motor-integrated inverter of claim 2, wherein the outer side part comprises a first outer side part having the inlet port formed at one side thereof such that the refrigerant flows to the outer side part and the inner side part, and a second outer side part comprising the outlet port formed at the other side thereof such that the refrigerant introduced into the inner side part is discharged through the outlet port.

4. The motor-integrated inverter of claim 3, wherein the communicating part comprises: a first communicating part formed at the other side of the first outer side part so as to communicate with the inner side part; a second communicating part formed at the other side of the second outer side part so as to communicate with the inner side part; and a third communicating part communicating with the inlet port such that the first outer side part and the inner side part communicate with each other.

5. The motor-integrated inverter of claim 4, wherein a flow velocity of the refrigerant flowing through the outer side part and the inner side part is set based on a size of a cross-sectional area of the third communicating part.

6. The motor-integrated inverter of claim 1, wherein the power module is disposed between the outer side part and the inner side part so as to be symmetric with reference to the shaft of the motor.

7. The motor-integrated inverter of claim 1, further comprising a capacitor part providing direct-current electric power to the power module,
    wherein the capacitor part comprises a through-hole formed through a center thereof.

8. The motor-integrated inverter of claim 7, wherein one side surface of the inner side part is in surface contact with the capacitor part.

9. The motor-integrated inverter of claim 7, wherein the shaft comprises an end part protruding outside a cover of the motor, and the end part of the shaft is inserted in the through-hole formed through the capacitor part.

10. The motor-integrated inverter of claim 7, further comprising a power module busbar to which motor driving electric power output from the power module is transferred, wherein the power module busbar extends from the power module to an upper side of the capacitor part.

11. The motor-integrated inverter of claim 10, wherein the power module busbar is fastened to a motor busbar connected to an input terminal receiving each phase driving electric power of the motor at the upper side of the capacitor part.

* * * * *